Feb. 7, 1939.   W. E. WIESENTHAL   2,146,492
SOIL TILLING DEVICE
Filed June 20, 1938   2 Sheets-Sheet 1

W. E. WIESENTHAL
INVENTOR.

BY C. A. Snow & Co.
ATTORNEYS.

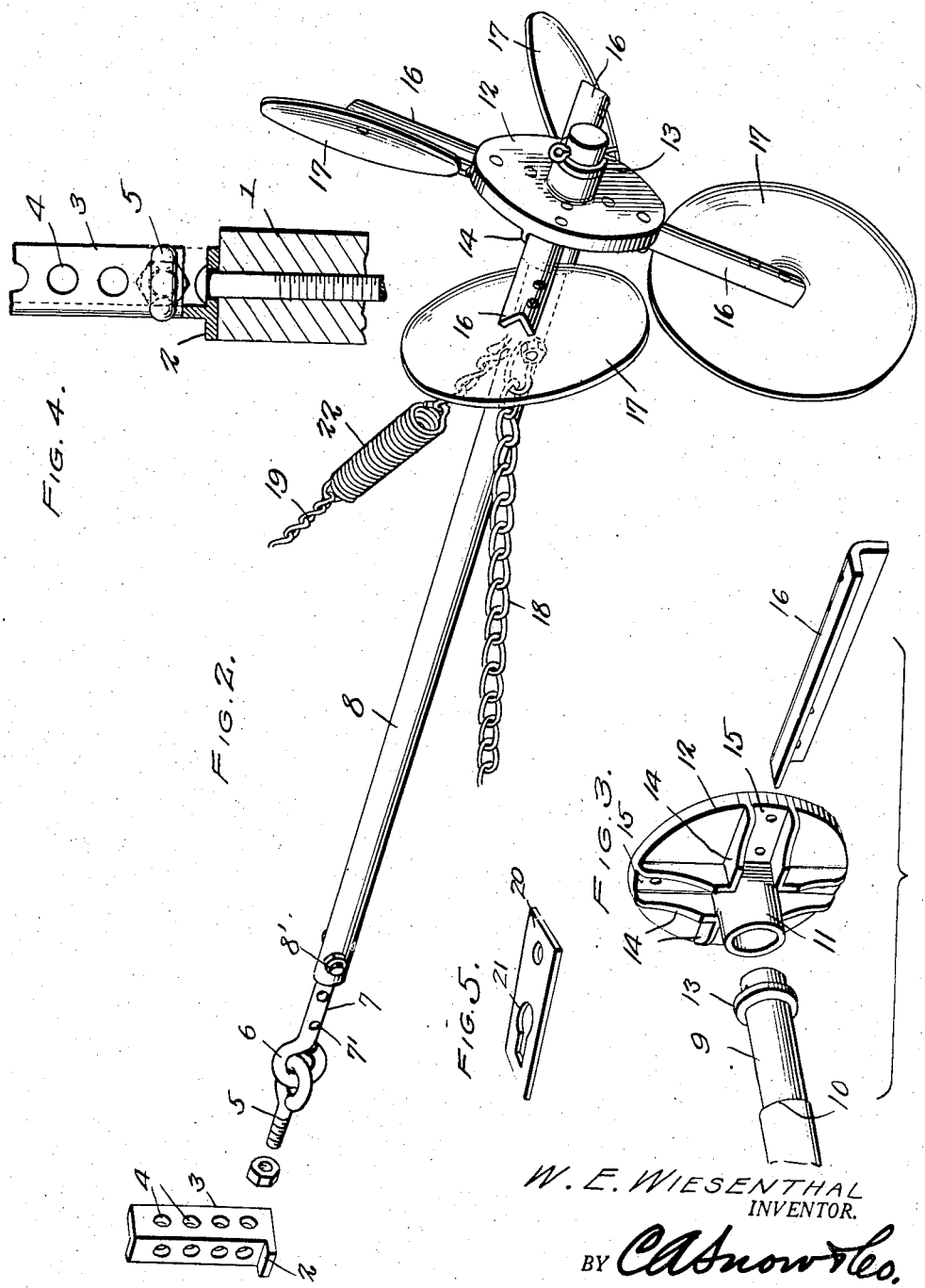

Patented Feb. 7, 1939

2,146,492

UNITED STATES PATENT OFFICE 2,146,492

SOIL TILLING DEVICE

Walter E. Wiesenthal, Wilson, Kans., assignor to The F. Wyatt Mfg. Co., Inc., Salina, Kans.

Application June 20, 1938, Serial No. 214,807

12 Claims. (Cl. 55—30)

This invention relates to a soil tilling device for use as an attachment to be connected to plows, disc cultivators, and the like, the primary purpose of the attachment being to sweep across the path of movement of the cultivator or the like to which it is attached, the construction and operation of the attachment being such that the engaged soil will be shifted to form indentations and adjacent hills or mounds.

A further object is to produce a surface contour such as above stated for the purpose of retaining moisture in the depressions, the elevated portions or mounds serving both to shield the moisture within the depressions and to check the drift of soil.

A further object is to provide an attachment of this character which is simple and durable in construction and can be applied readily to a cultivator, plow or the like, it being possible in a simple way to adjust the attachment so as to regulate the depth of the depressions produced thereby.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

In the accompanying drawings the preferred form of the invention has been shown.

In said drawings:

Figure 2 is a perspective view of one of the devices constituting the present invention.

Figure 3 is a perspective view showing portions of the tilling device separated.

Figure 4 is a view partly in elevation and partly in section of the mounting provided for the arm of one of the tilling devices.

Figure 5 is a perspective view of one of the keepers forming a part of the adjusting means.

Figure 1:
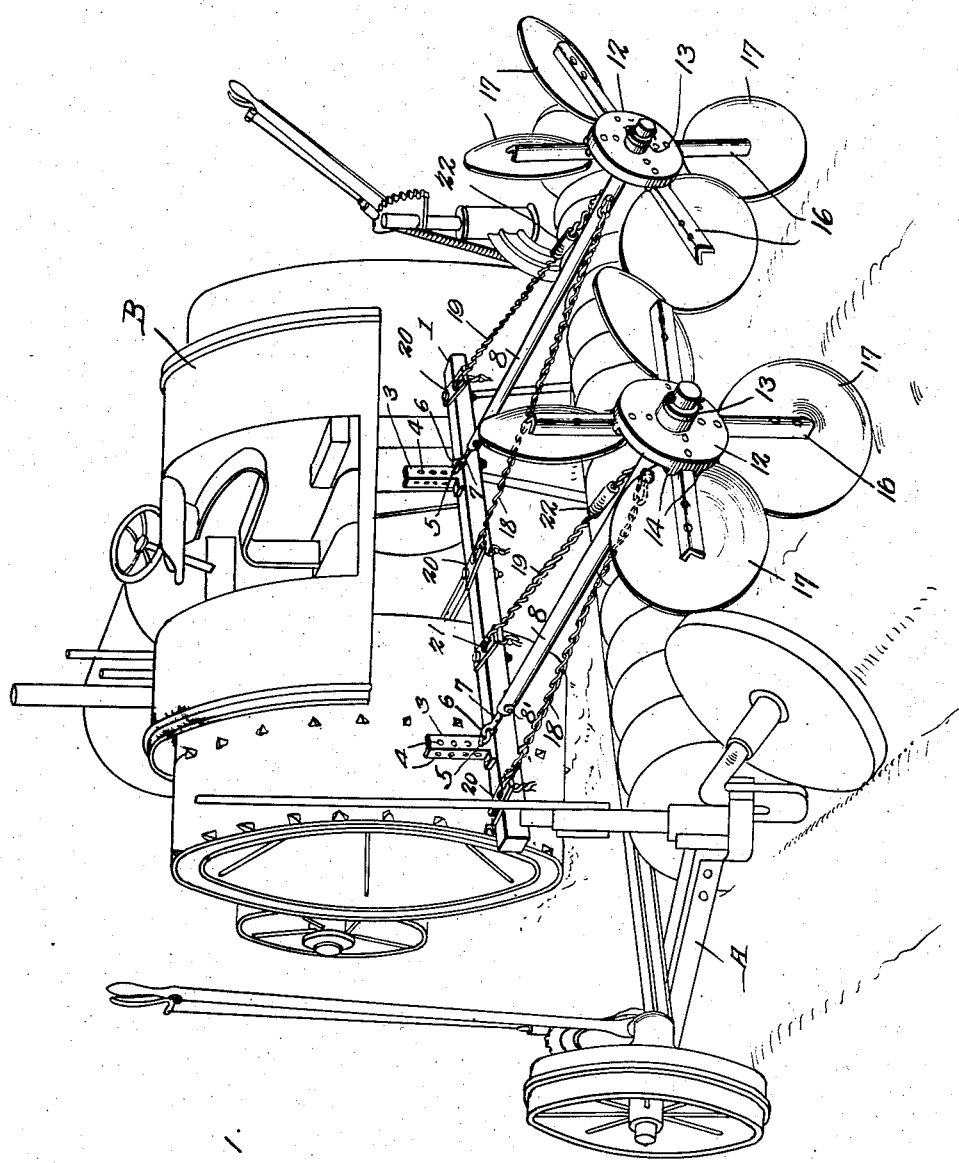
Figure 1 is a perspective view showing the present improvements combined with a tractor drawn harrow or cultivator.

Referring to the figures by characters of reference A designates a disc cultivator, or the like which can be drawn in any suitable manner, as by means of a tractor B. It is to be understood, however, that in lieu of these structures, other soil engaging implements can be used such as plows, etc. It is merely essential that some means be provided whereby a bar 1 can be arranged transversely of and rigidly supported by the soil engaging implement.

Bolted on the bar 1 is a plate 2 forming the base of an upstanding angle strip 3 provided in each side with a longitudinal series of apertures 4. Any one of these is adapted to receive an eye bolt 5 loosely engaged by an eye 6 at one end of a rod 7 having a longitudinal series of apertures 7' and adjustably mounted in a tubular bar 8. A pin 8' extends through the bar and is seated in one of the openings 7' to hold the bar and tube against relative movement. The rear end portion of bar 8 is preferably reduced in diameter as shown at 9 so as to provide an annular shoulder 10 against which the hub 11 of a disc 12 is adapted to bear. This hub is rotatably mounted on the reduced portion 9 and is preferably held in place thereon by a thrust receiving washer or bearing ring 13 which can be held detachably to the draw bar by any suitable means provided for that purpose.

The front or advancing face of the disc 12 is formed with parallel flanges 14 extending from hub 11 to the periphery of the disc and cooperating to produce radial channels 15. In each of these channels is bolted or otherwise secured an arm 16 substantially L-shaped in cross section and with its longitudinal edges disposed in a plane substantially forty-five degrees to the plane of rotation of the disc. These edges are adapted to bear against the rear or convexed faces of discs 17 the front faces of which are concaved and the periphery of each disc is located in a plane substantially forty-five degrees to the plane of rotation of the disc.

For the purpose of holding the draw bar 8 under restraint, chains or other flexible devices indicated at 18 and 19 are joined to the bar at a point adjacent to the hub 11 and these connections diverge forwardly where they are adjustably attached to plates 20 secured to and extending from the bar 1. In the structure shown each of these plates have keyhole slots 21 through which the chain extends so that by lifting the chain it can be pulled longitudinally and then by lowering it into the restricted portion of the slot, the chain will be held against longitudinal movement. One of the chains, 19, includes a spring portion 22 whereby a resilient connection is provided between draw bar 8 and the bar 1.

In the structure illustrated two draw bars 8 are extended rearwardly from bar 1 and each of these is equipped with a pair of flexible restraining elements 18 and 19 so that, under normal conditions, the draw bars 8 are substantially parallel. During the plowing or harrowing of the soil by the forward movement of the implement A, the discs 17 of each attachment will be brought successively into contact with the soil and, because of the angle at which they are pitched, the resistance encountered thereby will result in the discs being rotated about the draw bar 8 so that they will be brought successively into contact with the ground. While each disc is in engagement with the ground and rotating relative thereto it is also pulling soil forwardly and laterally and this results in the formation of a depression by each disc and also the creation of a hill or mound adjacent to the depression made up of the soil displaced by the disc. After the completion of the formation of each depression and the adjacent hill or mound, another disc is brought into action to produce another depression and hill or mound. This operation takes place repeatedly as the apparatus is pulled over the field. Should the discs during their counter-clockwise rotation as viewed in Figs. 1 and 2, encounter any unyielding obstructions, the springs at 22 will yield sufficiently to prevent injury to the parts. By adjusting the flexible connections 18 and 19 the normal positions of the draw bars 8 relative to the cross bar 1 can be changed at will, it being understood that these arms are free to swing in any direction at the coupling formed by the parts 5 and 6.

The spring 22 in each of the connections 19 constitutes one of the most essential parts of the invention. This spring produces a mechanical action which permits regulation of the depth of the holes produced by the machine. When the disc starts cutting the ground, the spring elongates and produces additional pressure on the disc, thus causing it to cut deeper. As the disc rotates the spring will be placed under increased tension and this will continue until, as a result of the circular motion, the disc starts to leave the ground at which time, when the tension of the spring becomes equal to pressure on the disk, the spring will act automatically to lift and unload the disc. At the same time the next following disc will be forced down into the ground and the foregoing operation repeated.

As the connections 18 and 19 are inclined downwardly and forwardly relative to the draw bars 8, it will be obvious that by lengthening or shortening these connections, the draw bars may be initially held in any desired angle, thereby to regulate the depth of the depressions thus produced by the discs, as well as the height of the mounds produced as a result thereof.

It has been found that by using this equipment on a newly plowed or harrowed field, evenly distributed depressions and mounds will be formed and, as a result, moisture will be retained in the depressions while the adjacent mounds serve to reduce shifting of soil. This treatment also eliminates practically all damage resulting from heavy rains which frequently result in washouts. The provision of the depressions permits the rain water to be retained in these depressions in small pools scattered throughout the field.

It is to be understood that the term "disc" is employed to designate a blade of any shape capable of operating as set forth.

What is claimed is:

1. A tilling attachment for agricultural machines including a draw bar positioned to trail behind a machine to which it is attached, a series of radially disposed arms mounted for rotation on the draw bar, discs fixedly secured with respect to the arms and pitched at such angles as to rotate the series of arms about the draw bar and bring the discs successively into engagement with the soil during the forward movement of the attachment.

2. The combination with a structure mounted for movement over a field, of a rotatable series of radially spaced concavo-convexed discs connected to and adapted to trail said structure, said discs being pitched at such an angle as to cause the discs to rotate as a series transversely of path of movement over a field thereby successively to engage the soil and displace it to form a depression and an adjacent mound.

3. A tilling attachment for agricultural machines including a draw bar, means for attaching the draw bar to the machine to trail the same, a series of radially disposed concavo-convexed discs, said series being mounted for free rotation upon the bar, each disc being pitched at such an angle as to dig in and displace a portion of the soil during the forward movement of the attachment and set up a rotation of the series of discs to bring another disc into soil engaging position.

4. A tilling attachment for agricultural machines including a draw bar, means for attaching it to a machine so as to trail the machine, a series of radial arms mounted for rotation on the draw bar, a concavo-convexed disc fixedly connected to each arm, all of the discs being pitched at such an angle as to set up a rotation of the series when contacting with the ground during the forward movement of the attachment, each disc, when rotated, constituting means for digging into and displacing a portion of the soil to form a depression and an adjacent mound.

5. A tilling attachment for agricultural machines including a draw bar, means for attaching the bar to a machine so as to trail the same, a disc mounted for rotation on the draw bar, arms radiating therefrom, concavo-convexed discs fixedly mounted on the respective arms, each disc being so pitched relative to the axis of rotation of the arms as to set up a rotation of the discs about said axis when the disc is in engagement with and moving forwardly against the soil, each disc, during such rotation, operating to sweep transversely of the path of movement of the series of discs and dig into the soil thereby to form a depression and an adjacent mound.

6. The combination of an agricultural machine for movement over a field, of a draw bar connected thereto for trailing the machine, a series of connected radial arms mounted for rotation about the draw bar, a concavo-convexed disc fixedly joined to and movable with each arm, all of said discs being pitched at such an angle that, when one of the discs is drawn forward in contact with the soil, it will set up a rotation of all of the discs, each of said discs constituting means for digging into the soil and displacing a portion thereof, thereby to produce a depression and an adjoining mound.

7. An attachment for agricultural machines adapted to be drawn over a field, including a draw bar, means for attaching the same to a machine so as to trail it, a series of annularly spaced concavo-convexed discs mounted for rotation on the bar, all of the discs being pitched at such an angle that any one of the discs when pulled forwardly while in engagement with the soil will set up a rotation of all of the discs about said bar, each disc constituting means for digging into the soil and displacing it laterally relative to the direction of movement of the bar thereby to produce a depression and an adjacent mound, and an adjustable means for regulating the depth of movement of the discs into the soil.

8. An attachment for agricultural machines to be moved over a field, including a draw bar, means for connecting the bar to the machine so as to trail it and permit up and down and lateral swinging movement of the bar, a series of radially disposed arms mounted for rotation on the drawbar, a concavo-convexed disc fixedly connected to each arm, all of the discs being pitched at such an angle that when one of the discs is pulled forwardly while in contact with the soil it will impart a rotation of all of the discs about the bar, each disc, while in rotating engagement with the soil constituting means for digging into the soil and displacing it to form a depression and an adjacent mound, forwardly diverging means for connecting the bar to the machine to restrain said bar against up and down and lateral swinging movement, said means being adjustable.

9. A tilling attachment including a draw bar, means for connecting said bar to a propelling means so as to trail it, a disc mounted for free rotation on the draw bar, arms radiating therefrom, a concavo-convexed disc fixedly mounted on each arm, all of the discs being similarly pitched and the pitch of each disc being such that when the disc is pulled forwardly while in contact with the soil, it will rotate all of the discs about the draw bar to cause the soil engaging discs to displace a portion of the soil thereby to form a depression and an adjoining mound and bring the next adjoining disc into contact with the soil.

10. A tilling attachment including a draw bar, means for connecting said bar to a propelling means so as to trail it, a disc mounted for free rotation on the draw bar, arms radiating therefrom, a concavo-convexed disc fixedly mounted on each arm, all of the discs being similarly pitched and the pitch of each disc being such that when the disc is pulled forwardly while in contact with the soil, it will rotate all of the discs about the draw bar to cause the soil engaging discs to displace a portion of the soil thereby to form a depression and an adjoining mound and bring the next adjoining disc into contact with the soil, and flexible bracing elements diverging forwardly from the draw bar, one of said elements including a resilient portion.

11. A tilling attachment for agricultural machines including a draw bar positioned to trail behind a machine to which it is attached, a series of radially disposed arms mounted for rotation on the draw bar, discs fixedly secured to the respective arms and pitched at such angles as to rotate the series of arms about the draw bar and bring the discs successively into engagement with the soil during the forward movement of the attachment, and resilient means for resisting lateral swinging of the draw bar under resistance encountered by the rotating discs while in engagement with the soil, thereby to store up energy to lift and unload the said disc and force the next succeeding disc into engagement with the ground.

12. A tilling attachment for agricultural machines including a draw bar, means for attaching the bar to the machine to swing in any direction relative thereto and to trail the machine, discs spaced annularly about the draw bar and mounted for rotation about the longitudinal axis of the bar, said discs being held against rotation about their individual axis, all of the discs being pitched at such angles as to rotate about the axis of the draw bar and move successively into engagement with the soil during the forward movement of the attachment while dragging on the soil, the pitch of the disc also being such as to swing the discs and bar laterally during the forward movement of a soil-engaging disc, and yielding means for resisting the lateral swinging movement of the bar and disc and storing energy to disengage said disc from the soil and unload it and at the same time bring the next succeeding disc into soil-engaging position.

WALTER E. WIESENTHAL.